United States Patent
Ayyagari et al.

(10) Patent No.: US 7,020,681 B1
(45) Date of Patent: Mar. 28, 2006

(54) METHOD FOR CACHING XML DOCUMENTS VIEWABLE ON DEVICES WITH DIFFERENT DISPLAYS

(75) Inventors: Venkata S. Ayyagari, Cupertino, CA (US); Polina Kuznetsov, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 899 days.

(21) Appl. No.: 09/593,742

(22) Filed: Jun. 14, 2000

Related U.S. Application Data (60) Provisional application No. 60/138,685, filed on Jun. 14, 1999.

(51) Int. Cl.
  *G06F 15/16* (2006.01)

(52) U.S. Cl. .................. 709/203; 709/235; 715/513; 719/329

(58) Field of Classification Search ............. 709/203, 709/235; 715/513; 719/329
See application file for complete search history.

(56) References Cited

U.S. PATENT DOCUMENTS

| | | | |
|---|---|---|---|
| 4,638,298 A | | 1/1987 | Spiro |
| 5,864,852 A | | 1/1999 | Luotonen |
| 5,931,913 A | | 8/1999 | Meriwether et al. |
| 6,035,281 A | * | 3/2000 | Crosskey et al. ............. 705/14 |
| 6,292,835 B1 | * | 9/2001 | Huang et al. ................ 709/235 |
| 6,349,202 B1 | * | 2/2002 | Odamura .................. 455/412.1 |
| 6,401,059 B1 | * | 6/2002 | Shen et al. .................... 703/27 |
| 6,421,673 B1 | * | 7/2002 | Caldwell et al. ............... 707/10 |
| 6,466,971 B1 | * | 10/2002 | Humpleman et al. ........ 709/220 |
| 6,563,514 B1 | * | 5/2003 | Samar ........................ 345/711 |

FOREIGN PATENT DOCUMENTS

EP    WO 98/43177    10/1998

OTHER PUBLICATIONS

D. Johnson, "Converting PC GUIs for Non PC Devices, "Circuit Cellar Ink, vol. 91, pps. 40–42, 44–45, Connecticut, Feb. 1998.
M. Floyd, "Builiding and XML Workbench," New Architect Magazine, Online!, pps.1–6, May 1999.

* cited by examiner

*Primary Examiner*—William A. Cuchlinski, Jr.
*Assistant Examiner*—Thanh T. Nguyen
(74) *Attorney, Agent, or Firm*—Finnegan, Henderson, Farabow, Garrett & Dunner, L.L.P.

(57) ABSTRACT

Systems and methods consistent with this invention provide for efficient processing, caching and routing of XML documents through the use of a proxy server. The proxy server is coupled to at least one client computer and a plurality of remote servers on the Internet. The proxy server is adapted in this preferred embodiment to receive a document request in the form of a uniform resource locator (URL) from a client computer and to determine whether the document is an unprocessed XML document. If the document is an unprocessed XML document, the proxy server is further adapted to search a local cache for a processed version of the document, and to transmit the processed document to the requesting client. In the event the document is not found in local storage, the proxy server is adapted to process the XML document, route it to the client and then store the file in local storage in anticipation of subsequent requests for the same document.

10 Claims, 8 Drawing Sheets

METHOD FOR CACHING XML DOCUMENTS VIEWABLE ON DEVICES WITH DIFFERENT DISPLAYS

RELATED APPLICATIONS

This application claims priority in U.S. Provisional Application No. 60/138,685, entitled "Method and System for Offloading Processing of XML Documents to a Proxy Server" filed Jun. 14, 1999.

FIELD OF THE INVENTION

The present invention relates to the transfer and storage of information over an electronic network. More particularly, the invention relates to a proxy server caching mechanism that provides a method for retrieving, processing and storing XML documents for access by an end user.

DESCRIPTION OF THE PRIOR ART

Computers need to be told exactly what things are, how they are related and how to deal with them. From their beginning, computers have relied on programming languages to transform ideas and algorithms into useful digital processing system output. A network of computers like the Internet or its subset, the World Wide Web is no different. The Web relies on software to collect, process and disseminate data to its network users. Shortly after its inception, the Hypertext Markup Language (HTML) became the Web's de facto markup language with a set of symbols or codes that tell a Web browser how to display a Web page's content. HTML gained widespread popularity by providing an outstanding mechanism to deliver simple documents over the Web. It makes surfing the Web so simple, most people can effectively use it with little or no training.

Although HTML is the most successful electronic-publishing language ever invented, it is superficial. In essence, it describes how a Web browser should arrange text, images and push-buttons on a page, but its lack of structure creates significant barriers to using HTML for applications beyond simple browsing. For example, more and more people are trying to configure their Web sites to take orders from customers, transmit records, even run factories and scientific instruments from half a world away. Consequently, several enhancements and additions have been made to the suite of software systems operating on the Internet to make HTML sufficiently functional. Functionality is often added in HTML documents using Java, JavaScript, and Common Gateway Interface (CGI) programs. Unfortunately, adding functionality in this way obscures the clean, basic framework that HTML provides. Moreover, HTML has gone through almost yearly revisions arising from the efforts of browser vendors to extend the Web, followed by the efforts of standard bodies such as the World Wide Web Consortium (W3C) to keep up with the ever-changing state of the art.

To stem this flow of incessant change, a working group of the W3C developed a new kind of markup language now known as the Extensible Markup Language (XML). XML addresses many of HTML's limitations, by creating a whole new way to approach how Web sites are structured and designed. It also expands how relationships between content (the messages a Web site seeks to communicate) and form (the ways that content is formatted or presented, and the ways links between elements operate) may be expressed. An XML document is composed of data embedded within markup tags. These tags are similar to those used in HTML, except that the XML tags may be self-defined. In other words, XML tags define the internal structure of the embedded data. This convention change leads to a greatly increased number of tags in an XML document, compared to the identical HTML document. Consider this trivial HTML example:

<B>Venkata S. Ayyagari</B>
<P>
vsa@eng.sun.com<BR>
phone: 408–517-aaaa<BR>
fax: 408–863-bbbb<BR>
901 San Antonio Rd.<BR>
SUN Microsystems<BR>
MS UCUP02-201<BR>
Palo Alto, Calif.<BR>
94303<BR>.

This example represents information about an employee: name, phone, address, etc. The markup describes how the lines should be displayed (<B>Bold, <P>Paragraph Break, <BR>Line Break). When the HTML is processed by the browser, no semantics can be inferred. Consequently, the computer has no understanding of the kind of information being rendered and therefore cannot provide meaningful insight into its contents.

Now consider a possible XML representation of the same information that conveys the relationship between various data objects. In the XML version below, the employee is described by a name, an email address, phone and fax numbers, a location, and an address. Note that each conceptual piece of information is represented by its own XML element, such as <EMPLOYEE>, <NAME>, and <ADDRESS>.

```
<EMPLOYEE>
  <NAME>
     <FIRST>Venkata</FIRST>
     <MIDDLE>S</MIDDLE>
     <LAST>Ayyagari</LAST>
  </NAME>
  <EMAIL>vsa@eng.sun.com</EMAIL>
  <PHONE>408-517-aaaa</PHONE>
  <FAX>408-863-bbbb</FAX>
  <LOCATION>
     <STREET NUMBER>901</STREET NUMBER>
     <STREET NAME>San Antonio Rd</STREET NAME>
  </LOCATION>
  <ADDRESS>
     <ORG>SUN Microsystems</ORG>
     <MAILSTOP>MS UCUP02-201</MAILSTOP>
     <CITY>Palo Alto</CITY>
     <STATE>CA</STATE>
     <ZIP>94303</ZIP>
  </ADDRESS>
</EMPLOYEE>
```

The advantage of XML in this example is that it preserves the semantics and structure of the data in a hierarchical form. An employee object consists of name, email, phone, fax, location, and address objects. A name consists of first, middle, and last components, a location contains a building and a room object, etc.

XML representations, in further contrast to HTML, do not contain a description of how to display the content. XML instead stores the rendering (e.g., fonts, colors, leading, margins, typefaces, and other aspects of style) in an Extensible Stylesheet Language (XSL) document called a "stylesheet." Separating the functionality in this way allows publishers, who would often like to "write once and publish everywhere"—to distill the substance of a publication and then pour it into myriad forms, both printed and electronic. Further complicating the differences between XML and HTML is the fact that a stylesheet can be associated with a client and/or a server. In other words, a server can apply a particular stylesheet to an XML document and then transmit the document to a client computer that also applies its own stylesheet to the document. Having an XSL processor on the server side means that one can make use of the flexibility and power of XML without having to worry about whether a particular client provides XSL. However, in order to take full advantage of XML and XSL, a scenario where the rendering occurs on the client side is most appropriate. Having the server send XML data in conjunction with XSL stylesheets to a client allows that client to use different stylesheets based on user preferences and the like, without having to refer back to the XSL stylesheet stored on the remote server. Having the client send out XML and XSL provides other benefits as well. A user is able to use a stylesheet-that the server does not know about. This allows for full customization of renderings based on a user's needs. Also, XML on the client side allows the client to use the same data and feed it into a database or send it to a speech synthesis program. It is also easy to envision one stylesheet for rendering in the browser and yet another one, working on the same data, for preparing high-quality printouts. Stylesheets can also take XML documents and render them into multi-color, multi-font documents, braille, audible speech or any format desired simply by altering the associated stylesheet. Similar alterations to HTML documents could not be done without significant alterations to the underlying HTML program. Experts in the field believe that the change from HTML to XML has the potential to extend the Internet beyond mere information delivery to many other kinds of unimaginable human activity.

Thus, for its users, the XML-powered Web will be faster, friendlier and a better place to do business. Referring back to the previous example, it is obvious that a search for SUN Microsystems employees using the XML document would be much quicker, and more accurate from a similar search of the HTML document. Web site designers, on the other hand, will find it more demanding. Battalions of programmers will be needed to exploit new XML languages to their fullest. Future Web designers will need to be versed not just in the production of words and graphics but also in the construction of multilayered, interdependent systems of DTDs, data trees, hyperlink structures and stylesheets. Web clients correspondingly will need to possess more processing power to read an XML document, retrieve the appropriate stylesheet, and use it to sort and format the information on the screen. Just as it is obvious that Web servers will become more efficient and less burdened due to the organization and efficiencies provided by XML, it is equally clear that the current configuration of Web clients could quickly become inundated by the multiple file access operations necessary to process a single XML document. This reality is particularly true with respect to "thin clients" like personal data assistants (PDAs), embedded devices, etc.

There is a need therefore for an apparatus and method that minimizes unnecessary network traffic; provides XML processing capability to clients not otherwise capable of such processing; optimizes processing of XML documents on the Internet; and prevents redundant processing of XML documents.

SUMMARY OF THE INVENTION

Systems and methods consistent with this invention provide for efficient processing, caching and routing of XML documents through the use of a proxy server. The proxy server interfaces with at least one client computer and a plurality of remote servers on the Internet. The proxy server is adapted to receive a document request in the form of a uniform resource locator (URL) from a client computer, to forward the request to a designated remote server based on the URL, to receive the requested document from the remote server, and to determine whether the document is an unprocessed XML document. If the document is an unprocessed XML document, the proxy server is further adapted to search a local cache for a processed version of the document and to transmit the processed document to the requesting client. In the event the document is not found in local storage, the proxy server is adapted to process the XML document, route it to the client and then store the file in local storage in anticipation of subsequent requests for the same document.

In another aspect of the subject invention, the proxy server simply monitors traffic destined for a client. When it identifies an unprocessed XML document being routed to the client, the proxy server searches a local cache for a processed version of the XML document, and routes the processed document to the client, if a processed version was found. In the event the document is not found in local storage, again the proxy server is adapted to process the XML document, route it to the client and then store the file in local storage in anticipation of subsequent requests for the same document.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

DETAILED DESCRIPTION

A system in accordance with the present invention comprises a proxy server interfacing with at least one client computer and a plurality of remote servers on the Internet. The proxy server is adapted to receive a document request in the form of a uniform resource locator (URL) from a client computer, to forward the request to a designated remote server based on the URL, to receive the requested document from the remote server, and to determine whether the document is an unprocessed XML document. If the document is an unprocessed XML document, the proxy server is further adapted to search a local cache for a processed version of the document, and to transmit the processed version to the requesting client computer. In the event the document is not found in local cache, the proxy server is adapted to process the XML document, route it to the client computer and then store the processed XML document in the server's local cache.

Figure 1:
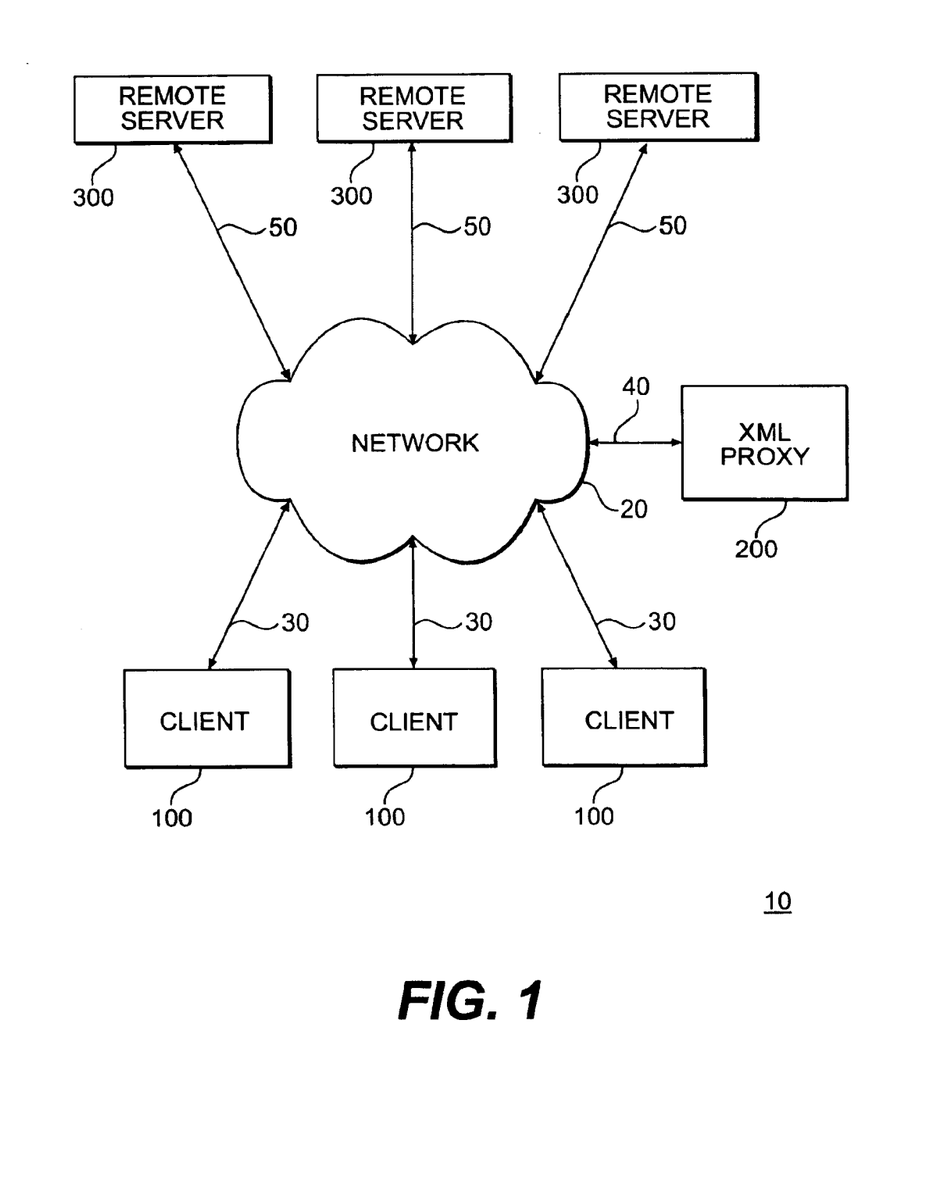
FIG. 1 is a block diagram of a computer network including an arrangement constructed in accordance with the subject invention.

Referring first to FIG. 1, an XML proxy network system 10 is comprised of a plurality of interconnected computers and microprocessors hosting a plurality of operating systems. By way of example, the network can be comprised of Pentium™ based microprocessors operating on Windows/NT, UNIX and/or Windows/CE operating systems. XML proxy network 10 includes client devices 100, an XML proxy server 200, and a plurality of remote server computers 300. The devices and computers, as shown in FIG. 1, are coupled to a network 20 which may be the Internet, via a series of network cable interfaces. More specifically, client devices 100 are connected to network 20 via cable interface 30, XML proxy server 200 is coupled to network 20 via cable interface 40, and remote server computers 300 are coupled to network 20 via cable interface 50.

Figure 2:
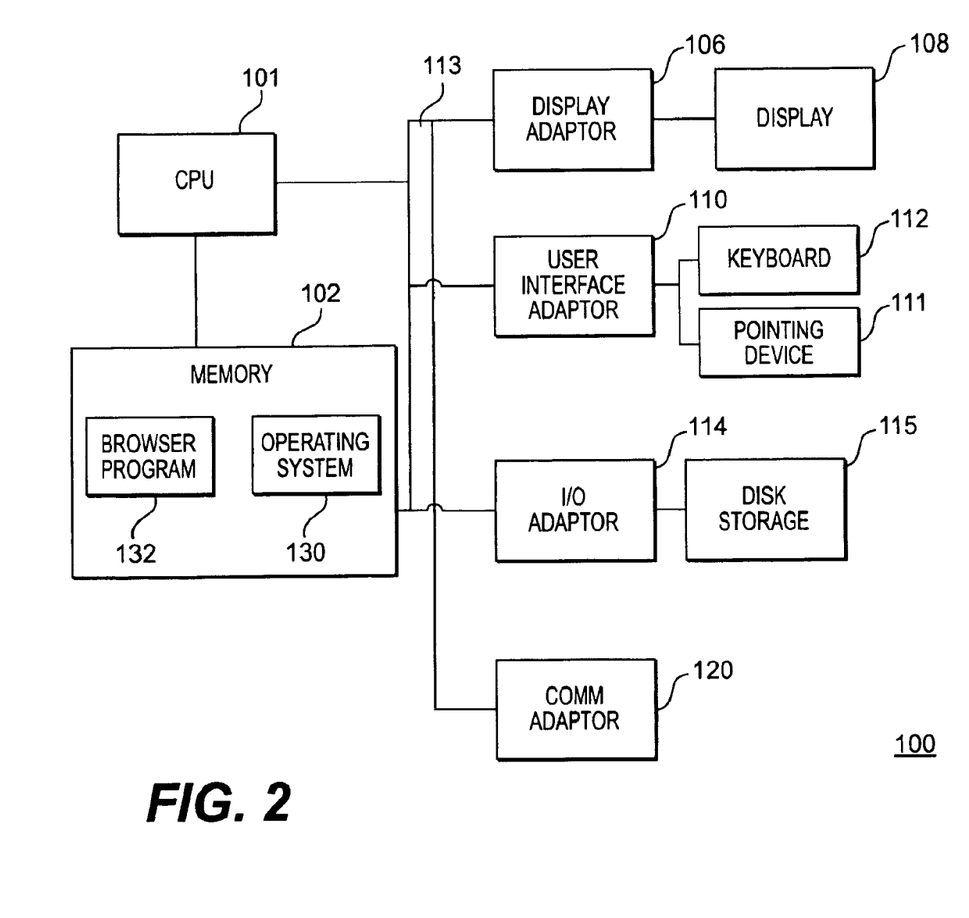
FIG. 2 is a block diagram of the client computer of FIG. 1.

A detailed diagram of client device 100 is shown in FIG. 2. As shown in FIG. 2, client device 100 is comprised of a central processor unit (CPU) 101, a memory 102, a display adapter 106, a display 108, a user interface (UI) adapter 110, a pointing device 111, a keyboard 112, an input/output (IO) adapter 114, a disk storage unit 115, and a communications adapter 120 for providing a communications function. Memory 102 includes an operating system 130 for operating the device and a browser program 132 for rendering and displaying content. As shown, the various components of each client device 100 communicate through a system bus 113 or similar architecture. There may be other components as well, but these are not shown to facilitate description of the unique aspects of this embodiment of the invention. The hardware arrangement of this computer, as well as the other computers discussed in this specification is intentionally shown as general, and is meant to represent a broad variety of architectures, which depend on the particular computing device used. As shown in FIG. 2, display adaptor 106 is coupled to display 108, user interface adaptor 110 is coupled to pointing device 111 and keyboard 112, I/O adaptor 114 is coupled to disk storage unit 115 and communications adaptor 120 is coupled to network interface cable 30 for providing connectivity between client computer 100 and network 20.

Figure 3:
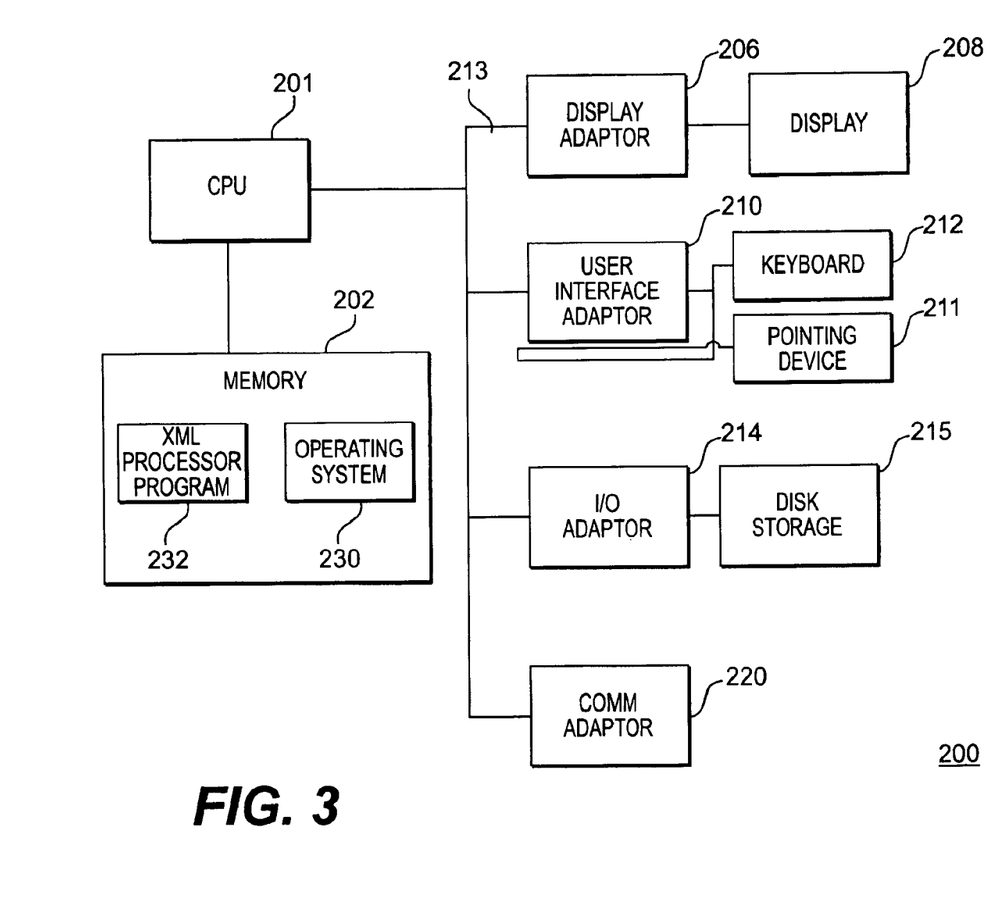
FIG. 3 is a block diagram of the XML proxy server of FIG. 1.

A detailed diagram of XML proxy server 200 is shown in FIG. 3. As with client devices 100, XML proxy server 200 is comprised of a CPU 201, a memory 202, a display adapter 206, a display 208, a UI adapter 210, a pointing device 211, a keyboard 212, an IO adapter 214, a disk storage unit 215, and a communications adapter 220. Memory 202 includes an operating system 230 and an XML processor program 232. As shown, the various components of each XML proxy server 200 communicate through a system bus 213 or similar architecture. Also, communications adaptor 220 is coupled to network interface cable 40 for providing connectivity between XML proxy server 200 and network 20.

Figure 4:
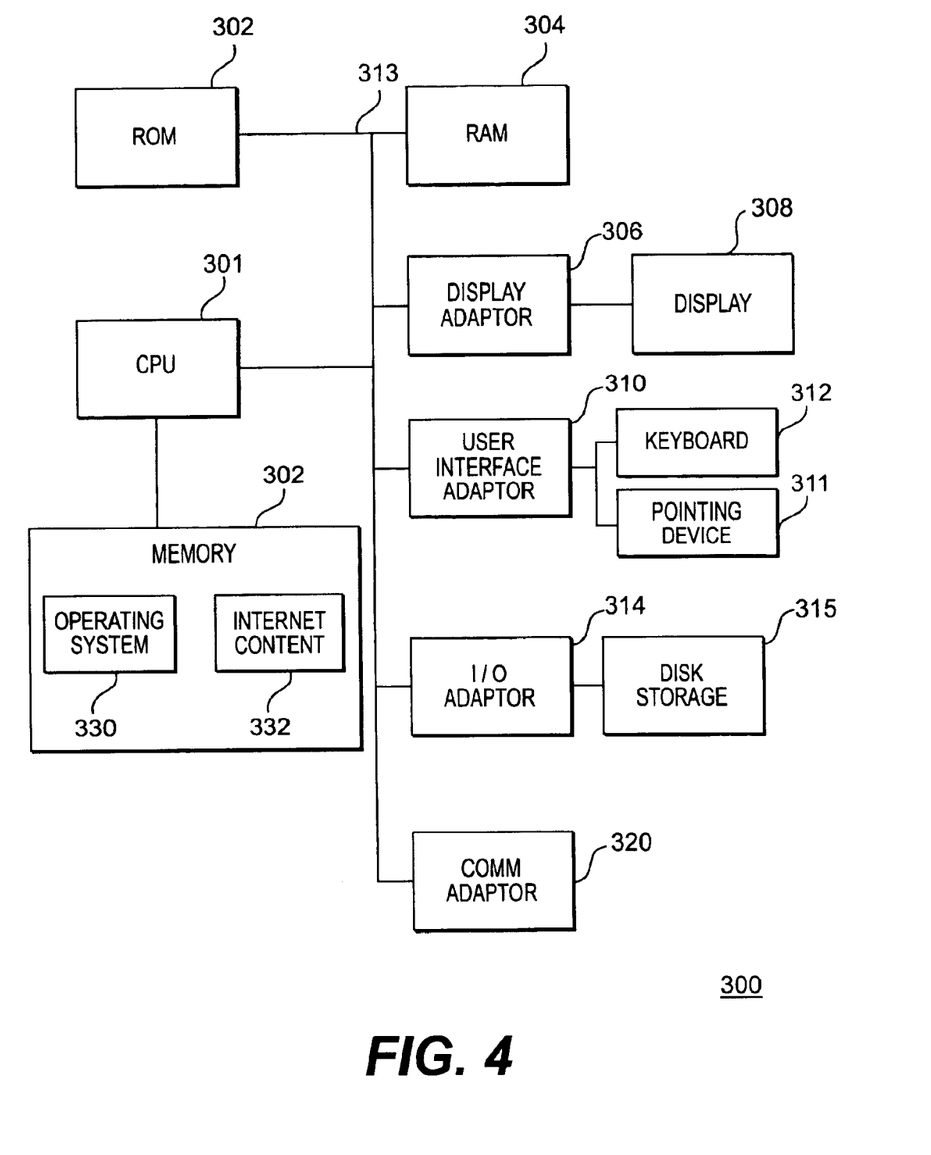
FIG. 4 is a block diagram of the remote server of FIG. 1.

A detailed diagram of remote server computer 300 is shown in FIG. 4. As shown, remote server computer 300 is comprised of the same hardware components as client computer 100 and XML proxy server 200. In addition, stored in memory 302 is the Internet content 332 associated with remote server computer 300.

Figure 5A:
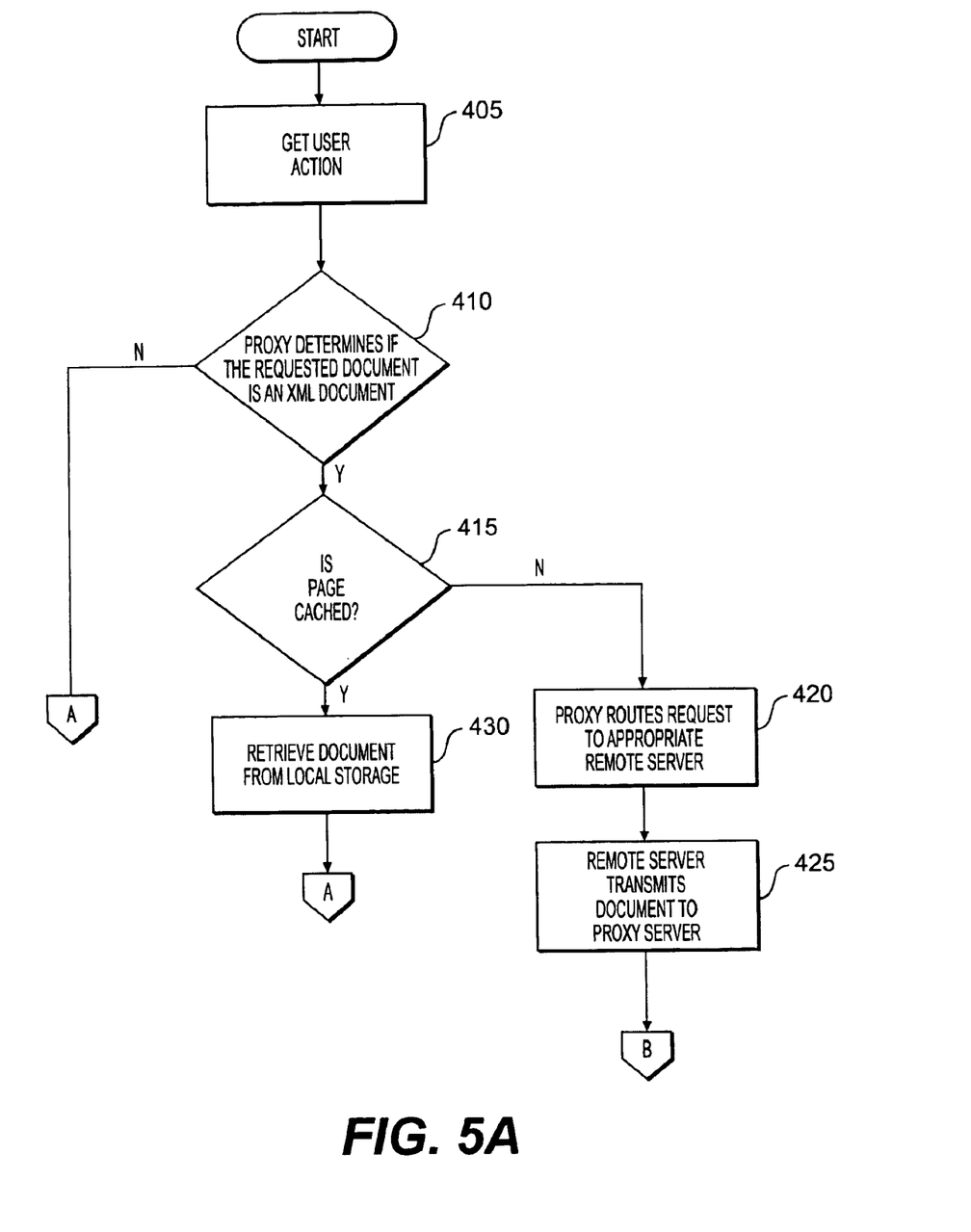
FIGS. 5A and 5B show a flow chart of steps for retrieving a document in accordance with the subject invention.
Figure 5B:
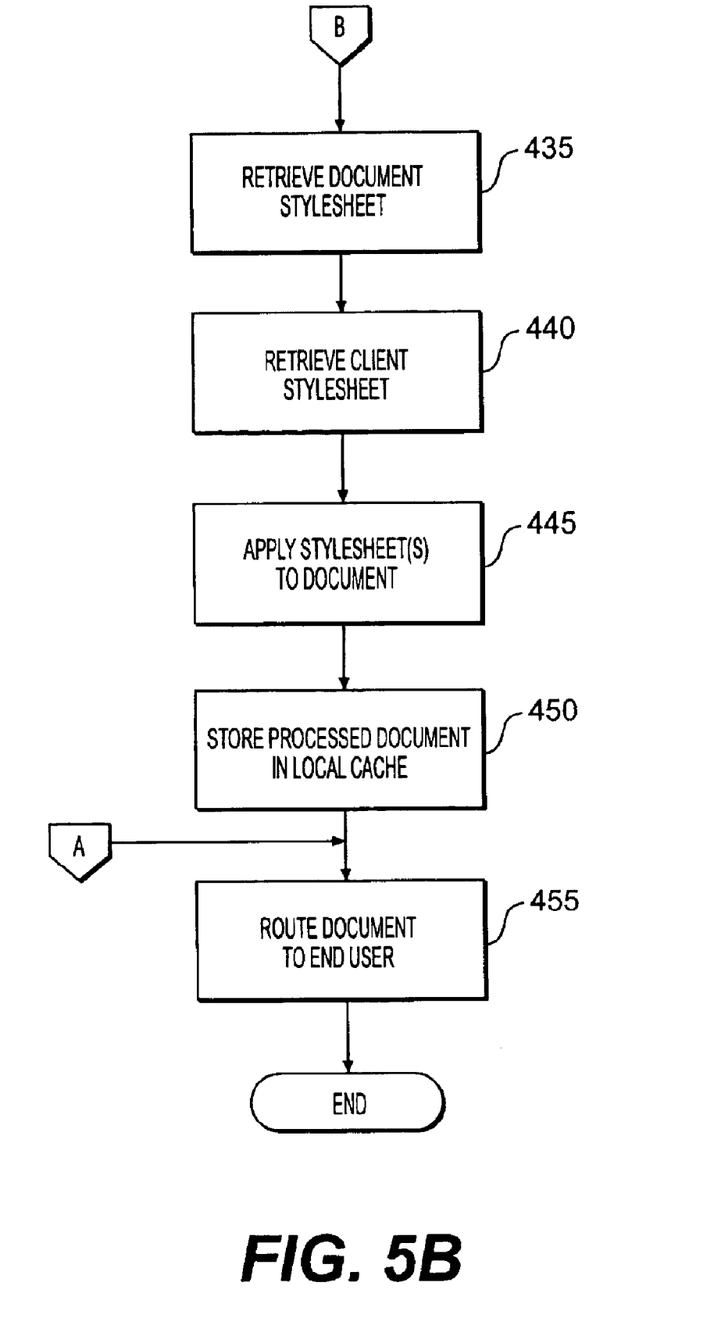

Referring now to FIGS. 5A and 5B, there is shown exemplary steps of XML processor program 232 for implementing the method for processing and routing XML documents in system 10 in accordance with an implementation of the present invention. Note that in this description, in order to facilitate explanation, the XML proxy server 200 is generally discussed as if it were a single device, and functions provided by the XML proxy server 200 are generally discussed as being performed by such single device.

However, XML proxy server 200 may actually comprise multiple physical and logical devices connected in a distributed architecture, and the various functions discussed below which are provided by XML proxy server 200 may actually be distributed among multiple server devices. As shown in FIG. 5A, a user action in the form of a uniform resource locator (URL) is received at step 405. The XML proxy server 200 decodes the received URL and then ascertains whether the document is an XML document (step 410). For a web page this can be done by examining the URL for a reference to "XML". For a mail message this can be done by examining the multipurpose Internet mail extension (MIME) for a reference to "XML". MIME refers to an official Internet standard that specifies how messages must be formatted so that they can be exchanged between different email systems. "Text/xml" and "application/xml" are two media types that enable the exchange of XML documents with various email systems. If XML proxy server 200 determines that the document is an XML document, processing flows to step 415, otherwise processing flows to step 455 (as shown in FIG. 5B). In step 415, XML proxy server 200 determines whether the document has been previously retrieved by the same or a different client computer 100 (i.e., is the document cached?) If the document is cached, processing flows to step 430 and the XML document is retrieved from the local cache 215 of XML proxy server 200. Processing then flows to step 455 of FIG. 5B and the proxy server 200 routes the document to the client device 100.

If the document has not been cached, proxy server 200 routes the request to the appropriate remote server 300 (step 420). Processing then flows to step 425 where the remote server 300 identifies the requested document, and routes it to XML proxy server 200. Processing flows from step 425 to step 435 of FIG. 5B where XML proxy server 200 locates and retrieves the document's stylesheet. Next, as shown on FIG. 5B, XML proxy server 200 retrieves client computer's 100 stylesheet in step 440. Processing then flows to step 445 where XML proxy server 200 applies any stylesheets to the document. Next, in step 450, XML proxy server 200 stores the processed document in local cache 215. In step 455 the document is routed to client device 100.

Thus, in connection with one embodiment, it should be appreciated from the schematic overview illustrated by FIG. 1 and the detailed schematics of FIGS. 2–4 that our invention may be employed in a distributed computer system environment which has internal, external and intranet networks collectively represented in our schematic overview by the network 20 to connect clients to World Wide Web servers and other servers within the system in which our invention is situated. The client computer 100 makes a request to the network 20 for a access to a Web site located anywhere on the entire network. The proxy server 200 with the facilities acts as an agent to review the data gathered from one or more of the multiple remote servers 300 coupled to the network 20 and convert it, if necessary into a format acceptable to the requesting client 100. Further details with respect to the use of our invention for information retrieval from the multiple remote servers 300 are provided with reference to FIGS. 6A and 6B.

Figure 6A:
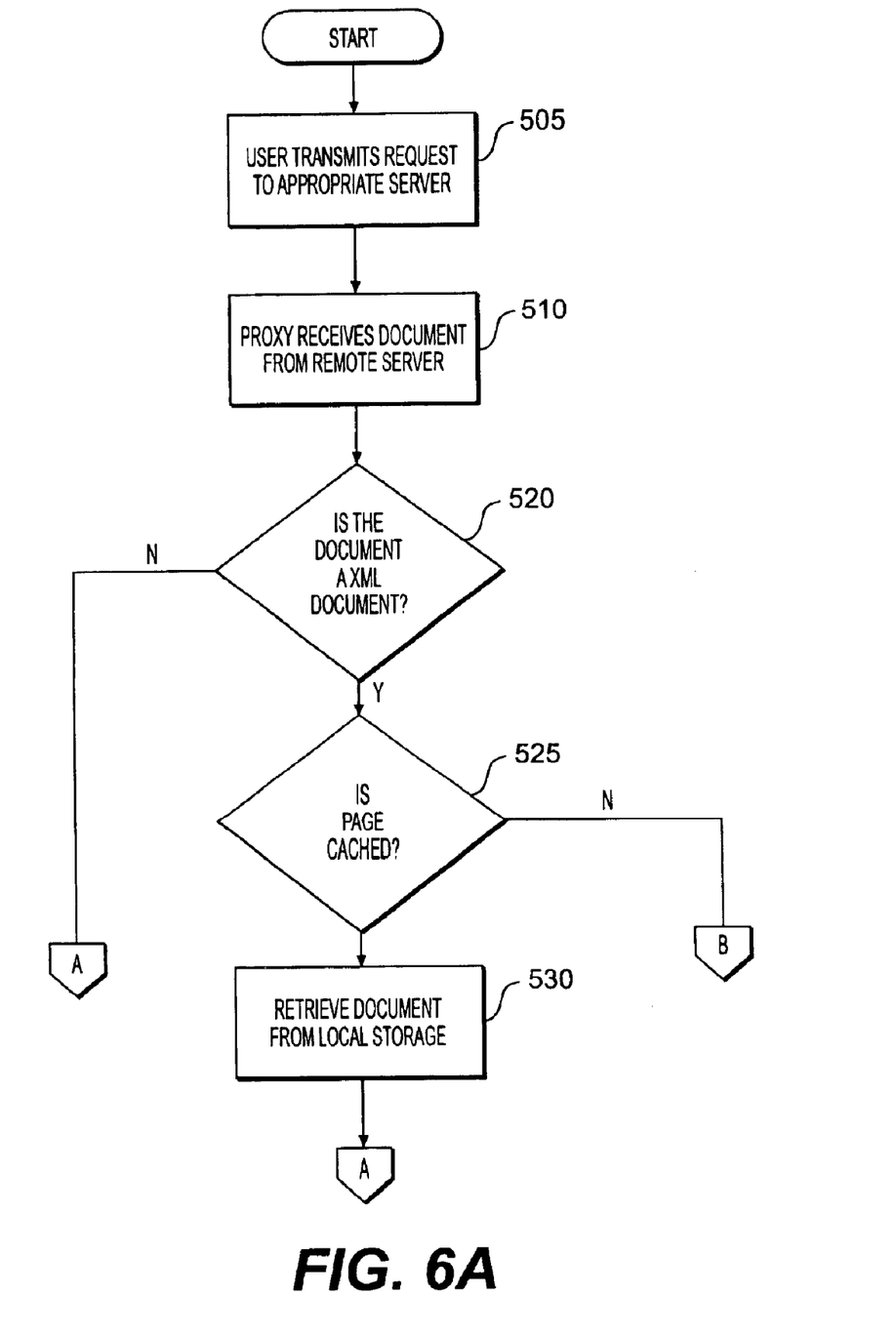
FIGS. 6A and 6B show a flow chart of an alternate set of steps for retrieving a document in accordance with the subject invention.
Figure 6B:
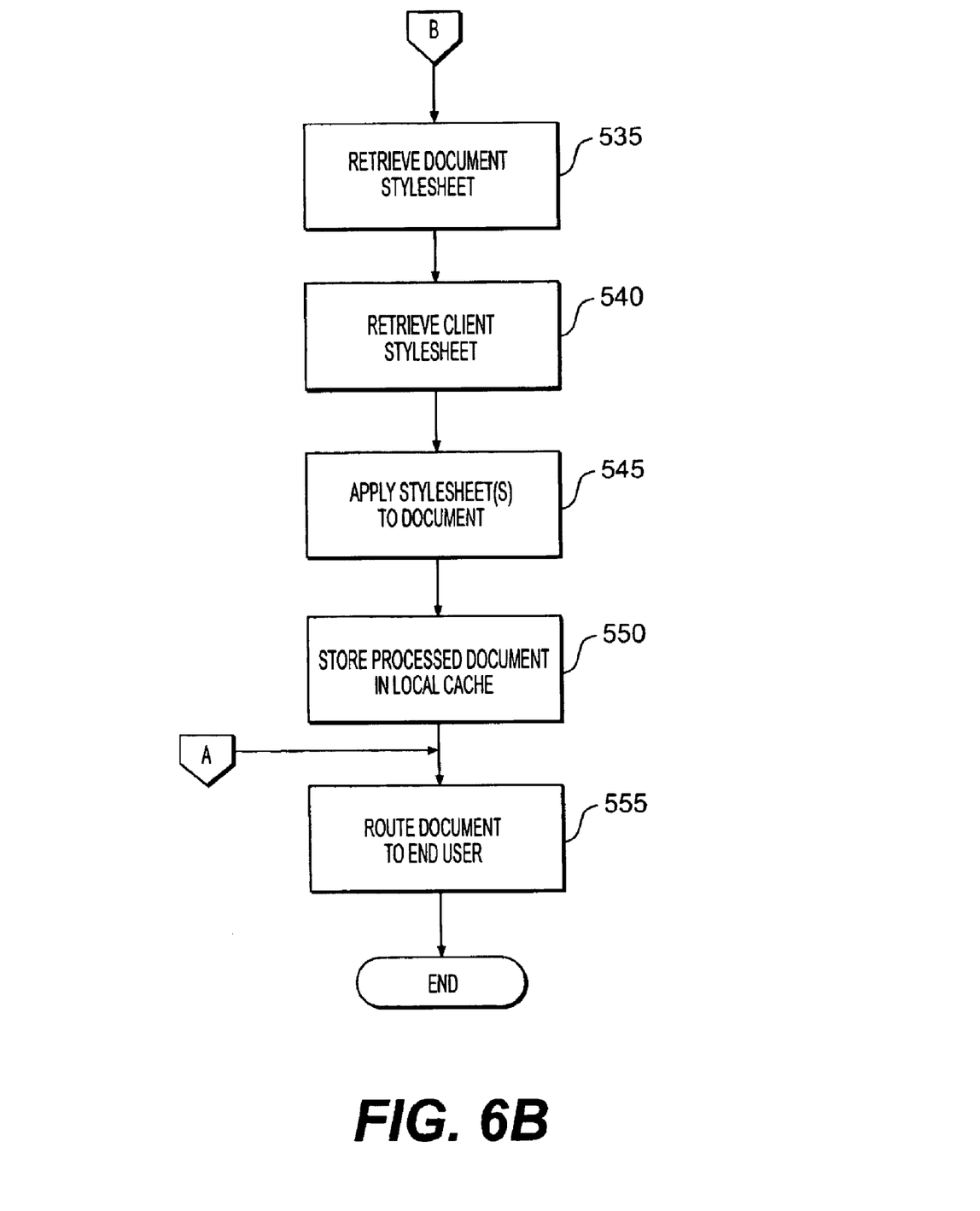

FIGS. 6A and 6B shows a flowchart of an alternate implementation of the process used by proxy server 200 for processing requests for XML documents. In this implementation the XML proxy server 200 does not receive document requests from client computers 100. Instead, XML proxy server 200 simply monitors document flow to client computer 100 to determine whether a document is an XML document and then either routes a previously stored document to the client computer 100 or performs processing on the unprocessed XML document before routing it to the client computer 100. As shown in step 505 of FIG. 5A, the process begins when a user transmits a request for a document directly to the appropriate remote server 300. In step 510, proxy server 200 receives the document from the remote server 300, and in step 520, XML proxy server 200 ascertains whether the document is an XML document. As in the case of the preferred embodiment, XML proxy server 200 performs this step by examining the URL. If XML proxy server 200 determines that the document is an XML document, processing flows to step 525, otherwise processing flows to step 555 (shown in FIG. 5B). In step 525, XML proxy server 200 determines whether the document has been cached. If the document is cached, processing flows to step 530 and the XML document is retrieved from the local cache 215 of XML proxy server 200 and processing then flows to step 555. If the document has not been cached, processing flows from step 525 to step 535 where XML proxy server 200 locates and retrieves the document's stylesheet. Next, turning to FIG. 5B, XML proxy server 200 retrieves client computer's 100 stylesheet in step 540. Processing then flows to step 545 where XML proxy server 200 applies one or both stylesheets to the document. Next, in step 550, XML proxy server 200 stores the processed document in local cache 215. In step 555 the document is routed to client computer 100, and in step 560, processing completes.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for processing content requests in a network having at least one content provider having stored documents in an unprocessed format, a proxy server and at least one client, the method comprising the following steps performed by the proxy server, of:
  receiving a request from the client for a document associated with the content provider;
  determining whether the document is an unprocessed extensible markup language (XML) document;
  when it is determined that the document is an unprocessed XML document, determining whether a processed version of the document is located in a local cache;
  when it is determined that the processed version of the document is located in the local cache, providing the processed version of the document to the client; and
  when it is determined that the processed version of the document is not located in the local cache, (i) obtaining the unprocessed document associated with the content provider; (ii) processing the unprocessed document in accordance with predetermined instructions associated with the unprocessed document; and (iii) providing the processed version of the identified processed document to the client.

2. The method of claim 1, wherein the step of processing the unprocessed document, further comprises the step of storing the processed version of the document in the local cache.

3. The method of claim 1, wherein the predetermined instructions associated with the unprocessed document are stored in a stylesheet associated with the content provider.

4. A method for processing content requests in a network having at least one content provider having stored documents in an unprocessed format, a proxy server and at least one client, the method comprising the following steps performed by the proxy server, of:
  receiving an unprocessed document from the content provider, wherein the document was requested by the client;
  determining whether the document is an unprocessed extensible markup language (XML) document;
  when it is determined that the document is an unprocessed XML document, determining whether a processed version of the document is located in a local cache;
  when it is determined that the processed version of the document is located in the local cache, providing the processed version of the document to the client; and
  when it is determined that the processed version of the document is not located in the local cache, (i) processing the unprocessed document in accordance with predetermined instructions associated with the unprocessed document; and (ii) providing the processed version of the identified processed document to the client.

5. The method of claim 4, wherein the step of processing the unprocessed document, further comprises the step of storing the processed version of the document in the local cache.

6. The method of claim 4, wherein the predetermined instructions associated with the unprocessed document are stored in a stylesheet.

7. An Internet Proxy server comprising: a memory having program instructions; and
  a processor configured to use the program instructions to receive a request from a client for a document associated with the content provider; to determine whether the document is an unprocessed extensible markup language (XML) document; when it is determined that the document is an unprocessed XML document, to determine whether a processed version of the document is located in a local cache; when it is determined that the processed version of the document is located in the local cache, to provide the processed version of the document to the client; and when it is determined that the processed version of the document is not located in the local cache, (i) obtain the unprocessed document associated with the content provider; (ii) process the unprocessed document in accordance with predetermined instructions associated with the unprocessed document; and (iii) provide the processed version of the identified processed document to the client.

8. The server of claim 7, wherein the instruction to process the unprocessed document, further comprises the step of storing the processed version of the document in the local cache.

9. The server of claim 7, wherein the predetermined instructions associated with the unprocessed document are stored in a stylesheet.

10. A data processing system for processing content requests in a network having at least one content provider having stored documents in an unprocessed format, a proxy server and at least one client, the system comprising:
  means for receiving a request from the client for a document associated with the content provider;
  means for determining whether the document is an unprocessed extensible markup language (XML) document;
  means for determining whether a processed version of the document is located in a local cache when it is determined that the document is an unprocessed XML document;

means for providing the processed version of the document to the client when it is determined that the processed version of the document is located in the local cache; and (i) means for obtaining the unprocessed document associated with the content provider when it is determined that the processed version of the document is not located in the local cache; (ii) means for processing the unprocessed document in accordance with predetermined instructions associated with the unprocessed document when it is determined that the processed version of the document is not located in the local cache; and (iii) means for providing the processed version of the identified processed document to the client when it is determined that the processed version of the document is not located in the local cache.

* * * * *